F. B. McDONALD.
NUT LOCK.
APPLICATION FILED AUG. 5, 1907. RENEWED MAR. 5, 1909.
920,374. Patented May 4, 1909.
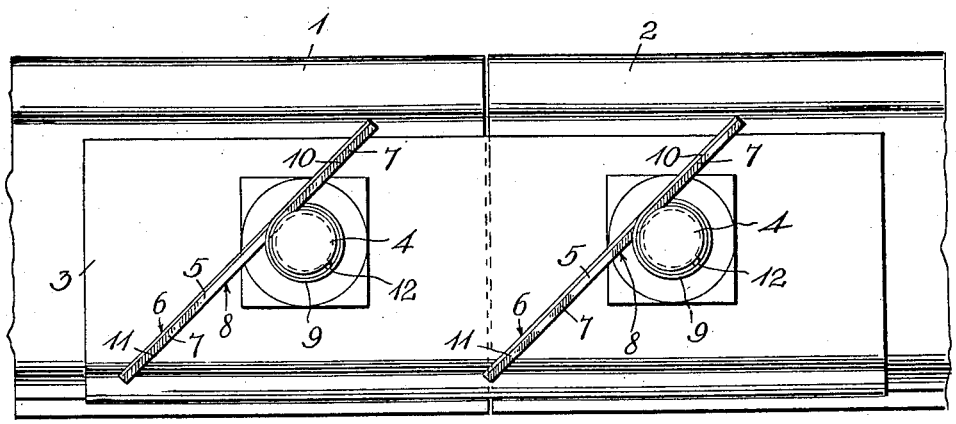
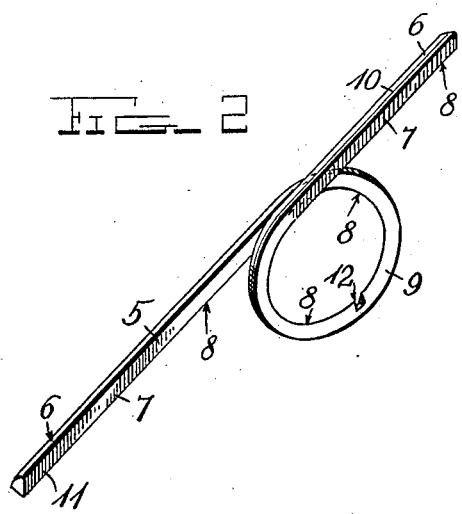
Witnesses
Inventor
Frank B. McDonald
by
Attorneys

UNITED STATES PATENT OFFICE.

FRANK B. McDONALD, OF EL DORADO, CALIFORNIA, ASSIGNOR OF ONE-THIRD TO ALBERT JACKSON AND ONE-THIRD TO CHARLES A. HARE, OF BAKERSFIELD, CALIFORNIA.

NUT-LOCK.

No. 920,374.  Specification of Letters Patent.  Patented May 4, 1909.

Application filed August 5, 1907, Serial No. 387,169. Renewed March 5, 1909. Serial No. 481,543.

*To all whom it may concern:*

Be it known that I, FRANK B. McDONALD, a citizen of the United States, residing at El Dorado, in the county of Eldorado and State of California, have invented certain new and useful Improvements in Nut-Locks; and I do declare the following to be a full, clear, and exact description of the invention, such as will enable others skilled in the art to which it appertains to make and use the same.

My invention has relation to new and useful improvements in nut locks and has for its object to provide simple and economical means whereby a nut may be securely locked against rotation after being screwed in position to the bolt.

With the foregoing and other objects in view which will appear as the nature of the invention is better understood, the invention consists of certain novel features of construction, combination and arrangement of parts as will be hereinafter fully described and claimed.

In the accompanying drawings, Figure 1 is a side elevation of a rail joint with my invention in position; and Fig. 2 is an enlarged detail perspective view of my invention.

Referring now more particularly to the drawings, the numerals 1, 2, 3 and 4 represent respectively two adjacent rails, a fish plate, a bolt passing through one end of one of the rails and fish plate and a nut screwed on the end of said bolt.

The numeral 5 represents my improved nut lock which is formed from one continuous piece of wire of spring steel or other metal having a suitable spring or resiliency. Said wire is preferably V-shaped in cross section having a rounded or flat upper edge or top 6 converging sides 7 and an inner sharp edge 8. In the construction of my invention, said wire is bent near one end to form a loop 9 leaving an upwardly extending oblique extension 10 and a downwardly extending oblique locking extension 11 of somewhat greater length than said extension 10. In the application of my invention, said loop works around the threaded end of a bolt and fits closely against the outer face of the nut, the inner sharp edge of the loop engaging in the screw of the bolt and the outer or free end of the downwardly extending oblique lock extension 11 resting upon the base of the fish plate 3.

The numeral 12 represents a recess formed in the inner sharp edge of the loop at a suitable point to permit said loop to be easily and readily expanded should it be desirous to remove it from position from the bolt.

While I have shown and described my invention as having but one loop, should it be found desirable in its construction and application, two, three or any number may be provided.

From the foregoing description taken in connection with the accompanying drawings, the construction and operation of the invention will be readily understood without requiring a more extended explanation.

Having thus described my invention, what I claim as new is:—

A nut lock for fish plate bolts comprising a continuous piece of resilient metal looped upon itself for application to a bolt, said piece being wedge-shaped in cross-section throughout its length, the resilient loop having within it a notch to allow ready releasing of the gripping action of said loop from the bolt threads, said loop having both terminals extended diagonally across the nut at a tangent to the loop and in directly opposite directions, said terminals engaging the fish plate to prevent the device from turning.

In testimony whereof I have hereunto set my hand in presence of two subscribing witnesses.

FRANK B. McDONALD.

Witnesses:
 I. L. NICHOLAS,
 JOHN H. E. LACLASS.